(12) United States Patent
Biggerstaff

(10) Patent No.: US 9,497,903 B2
(45) Date of Patent: Nov. 22, 2016

(54) COMBINE HARVESTER RESIDUE MANAGEMENT SYSTEM

(71) Applicant: AGCO Corporation, Hesston, KS (US)

(72) Inventor: Joseph Mark Biggerstaff, Wichita, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 14/857,214

(22) Filed: Sep. 17, 2015

(65) Prior Publication Data

US 2016/0106040 A1 Apr. 21, 2016

Related U.S. Application Data

(60) Provisional application No. 62/064,792, filed on Oct. 16, 2014.

(51) Int. Cl.
*A01F 12/40* (2006.01)

(52) U.S. Cl.
CPC ................. *A01F 12/40* (2013.01)

(58) Field of Classification Search
CPC .... A01D 41/1243; A01F 29/12; A01F 12/40
USPC .................................. 460/112, 111
See application file for complete search history.

(56) References Cited

U.S. PATENT DOCUMENTS

| | | | |
|---|---|---|---|
| 3,712,309 A | 1/1973 | Schmitz | |
| 4,669,489 A | 6/1987 | Schraeder et al. | |
| 5,833,533 A * | 11/1998 | Roberg | A01F 12/40 460/112 |
| 6,251,009 B1 * | 6/2001 | Grywacheski | A01F 12/40 460/112 |
| 6,547,169 B1 * | 4/2003 | Matousek | A01F 12/40 239/149 |
| 6,656,038 B1 * | 12/2003 | Persson | A01F 12/40 460/112 |
| 7,648,413 B2 * | 1/2010 | Duquesne | A01D 41/127 460/112 |
| 7,717,779 B1 * | 5/2010 | Weichholdt | A01D 41/1243 460/112 |
| 8,029,347 B2 * | 10/2011 | Pohlmann | A01D 41/1243 460/112 |
| 8,585,475 B2 * | 11/2013 | Isaac | A01F 12/40 460/111 |
| 2003/0003974 A1 * | 1/2003 | Niermann | A01D 41/1243 460/111 |
| 2003/0109294 A1 * | 6/2003 | Wolters | A01F 12/40 460/112 |
| 2003/0114207 A1 * | 6/2003 | Wolters | A01F 12/40 460/111 |
| 2004/0029624 A1 * | 2/2004 | Weichholdt | A01F 12/40 460/112 |
| 2004/0092298 A1 * | 5/2004 | Holmen | A01D 41/1243 460/111 |
| 2004/0137974 A1 * | 7/2004 | Weichholdt | A01F 12/40 460/112 |
| 2004/0176150 A1 * | 9/2004 | Gryspeerdt | A01F 12/40 460/112 |
| 2004/0176151 A1 * | 9/2004 | Gryspeerdt | A01F 12/40 460/112 |
| 2004/0242291 A1 * | 12/2004 | Weichholdt | A01D 41/1243 460/112 |
| 2005/0124399 A1 * | 6/2005 | Holmen | A01D 41/1243 460/111 |
| 2005/0124400 A1 * | 6/2005 | Schmidt | A01D 41/1243 460/111 |
| 2005/0282602 A1 * | 12/2005 | Redekop | A01F 12/40 460/112 |
| 2006/0246965 A1 * | 11/2006 | Lauer | A01F 12/40 460/111 |
| 2007/0066370 A1 * | 3/2007 | Redekop | A01D 41/1243 460/112 |
| 2008/0234019 A1 * | 9/2008 | Teroerde | A01F 12/444 460/100 |
| 2008/0305842 A1 * | 12/2008 | Benes | A01F 12/40 460/112 |
| 2009/0042625 A1 * | 2/2009 | Dow | A01D 41/1243 460/112 |
| 2009/0156277 A1 * | 6/2009 | Benes | A01D 41/1243 460/112 |

(Continued)

OTHER PUBLICATIONS

Intellectual Property Office, International Search Report for related UK Application No. GB1419676.0, dated Apr. 27, 2015.

*Primary Examiner* — Arpád Fábián-Kovács

(57) ABSTRACT

A combine harvester including a residue management system having a chaff spreader and a straw chopper, coupled by a mechanical linkage. Movement of the straw chopper from an operating position to the non-operating position is translated into pivoting of the chaff spreader from a spreading position to a non-spreading position.

7 Claims, 2 Drawing Sheets

(56) References Cited

U.S. PATENT DOCUMENTS

| | | | |
|---|---|---|---|
| 2009/0325659 A1* | 12/2009 | Overschelde | A01F 12/40 460/112 |
| 2010/0120482 A1* | 5/2010 | Holmen | A01D 41/1243 460/112 |
| 2010/0184494 A1* | 7/2010 | Klein | A01D 41/1243 460/112 |
| 2011/0045883 A1* | 2/2011 | Weichholdt | A01D 41/1243 460/112 |
| 2011/0053668 A1* | 3/2011 | Weichholdt | A01D 41/1243 460/112 |
| 2011/0053669 A1* | 3/2011 | Weichholdt | A01D 41/1243 460/112 |
| 2014/0364179 A1* | 12/2014 | Brinkmann | A01D 41/1243 460/112 |
| 2015/0351322 A1* | 12/2015 | Desmet | A01D 41/1243 460/114 |
| 2016/0088794 A1* | 3/2016 | Baumgarten | A01D 41/127 460/1 |

* cited by examiner

COMBINE HARVESTER RESIDUE MANAGEMENT SYSTEM

CROSS-REFERENCE TO RELATED APPLICATION

The present application claims the benefit of and priority from U.S. Provisional Application No. 62/064,792, filed Oct. 16, 2014, the entire disclosure of which is hereby incorporated by reference.

BACKGROUND OF THE INVENTION

Field of Invention

The invention relates to combine harvester residue management systems which include a straw chopper for chopping crop residue from separating apparatus and a chaff spreader for distributing chaff ejected from the rear of a cleaning shoe, both of which being located towards the rear of the harvester.

Description of Related Art

It is well known to provide straw chopping apparatus at the rear of combine harvesters to chop and spread crop residue, hereinafter referenced 'straw', ejected from the rear of separating apparatus. To cater for the different requirements of farmers, chopping and non-chopping configurations are typically provided. This allows the operator to select whether or not the straw is chopped and spread or conveyed directly onto the ground in a windrow for subsequent baling.

In some known systems a diverter (or baffle) plate is provided which directs the ejected straw either into the chopper or, in a different position, onto the ground. Alternatively, the chopper can be moved in to and out of a chopping position below the separating apparatus. In one example of such, U.S. Pat. No. 4,669,489 discloses a straw chopper which is slideably supported on a pair of spaced apart longitudinally oriented guide rails so that the chopper can be adjusted from a rearward operating position to a forward inoperative or windrow position. In a second example, U.S. Pat. No. 6,251,009 discloses a chopper having a housing which rotates from a chopping position into a rearwardly raised windrowing position.

A further benefit of providing a straw chopper which moves from one position to another is the increased convenience for maintenance and operator-access to the rear end of the separating apparatus and cleaning shoe.

It is also well known to install chaff spreaders behind the cleaning shoe for collecting and distributing the chaff ejected from the rear thereof. Typically the chaff spreader includes a pair of fan modules which eject the chaff at a tangent to the fan axis. Such a chaff spreader is disclosed in U.S. Pat. No. 6,656,038 for example, the contents of which are incorporated herein by reference.

It is known to mount the chaff spreading apparatus in a manner which permits movement of the chaff spreader from an operating position to a non-operating position, wherein the latter permits access for the operator to the rear of the cleaning shoe for cleaning or sieve replacement for example.

SUMMARY OF INVENTION

It is an object of the invention to provide a residue management system for a combine harvester which makes access and maintenance to the cleaning shoe and separating apparatus more convenient.

In accordance with the invention there is provided a combine harvester comprising a residue management system having a chaff spreader pivotally mounted proximate to a cleaning shoe ejection zone, the chaff spreader being pivotable about a transverse pivot axis between a spreading position and a non-spreading position, and a straw chopper mounted in the vicinity of a straw ejection zone, the straw chopper being moveable between an operating position and a non-operating position, and a mechanical linkage connecting the chaff spreader and straw chopper, wherein movement of the straw chopper from the operating position to the non-operating position is translated into pivoting of the chaff spreader from the spreading position to the non-spreading position.

By mechanically coupling the movement freedom of the straw chopper and chaff spreader, access to the rear end of the processing apparatus is gained more conveniently. In use, the operator need simply move one of the straw chopper or chaff spreader into a non-operative position wherein such action causes simultaneous movement of the other unit.

The chaff spreader may comprise at least one, typically two, fan modules mounted to an arm or frame which is pivotally connected to a frame member of the harvester, the fan module comprising a rotating impellor within a housing, the housing having an inlet for receiving chaff ejected by the cleaning shoe and an outlet for ejecting the received chaff.

In a preferred arrangement, the straw chopper is mounted to a frame member of the combine harvester by a sliding mechanism which permits linear movement of the straw chopper in a generally fore and aft direction between the operating position and non-operating position. Preferably further still, the slideable straw chopper can be positioned in a forward operating position or a rearward non-operating position. However, it is envisaged that the straw chopper may instead slide forward into the non-operating position depending on the architecture of the combine harvester upon which it is installed.

To facilitate such fore and aft sliding, a pair of longitudinally extending transversely spaced rails may be mounted inside a downwardly facing ejection outlet provided by a rear discharge hood which may be formed from the shielding of the combine harvester.

In an alternative arrangement, the straw chopper is mounted to a frame member by a pivoting mechanism which permits pivoting movement of the straw chopper around a generally transverse axis between the operating position and non-operating position.

The mechanical linkage preferably comprises a crank arm associated with the chaff spreader and a connecting rod connected between the crank arm and straw spreader. Such an arrangement is simple in construction with few parts to fail. Furthermore, the crank arm and connecting rod can be simply disconnected by operator when required, for example when only the chaff spreader is required in a non-operating position.

The residue management system preferably comprises an actuator such as a hydraulic cylinder or electric motor configured to control movement of the straw chopper between the operating position and the non-operating position. It should be appreciated that the actuator could instead be connected to the chaff spreader wherein the linkage serves to shift the other component in tandem.

These and other features and advantages of this invention are described in, or are apparent from, the following detailed description of various exemplary embodiments of the systems and methods according to this invention.

BRIEF DESCRIPTION OF DRAWINGS

Further advantages of the invention will become apparent from reading the following description of a specific embodiment with reference to the appended drawings in which:—

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. It should be understood that following use of relative terms such as forward, rearward, transverse and longitudinal will be made with reference to the normal forward direction of the combine harvester described.

Figure 1:
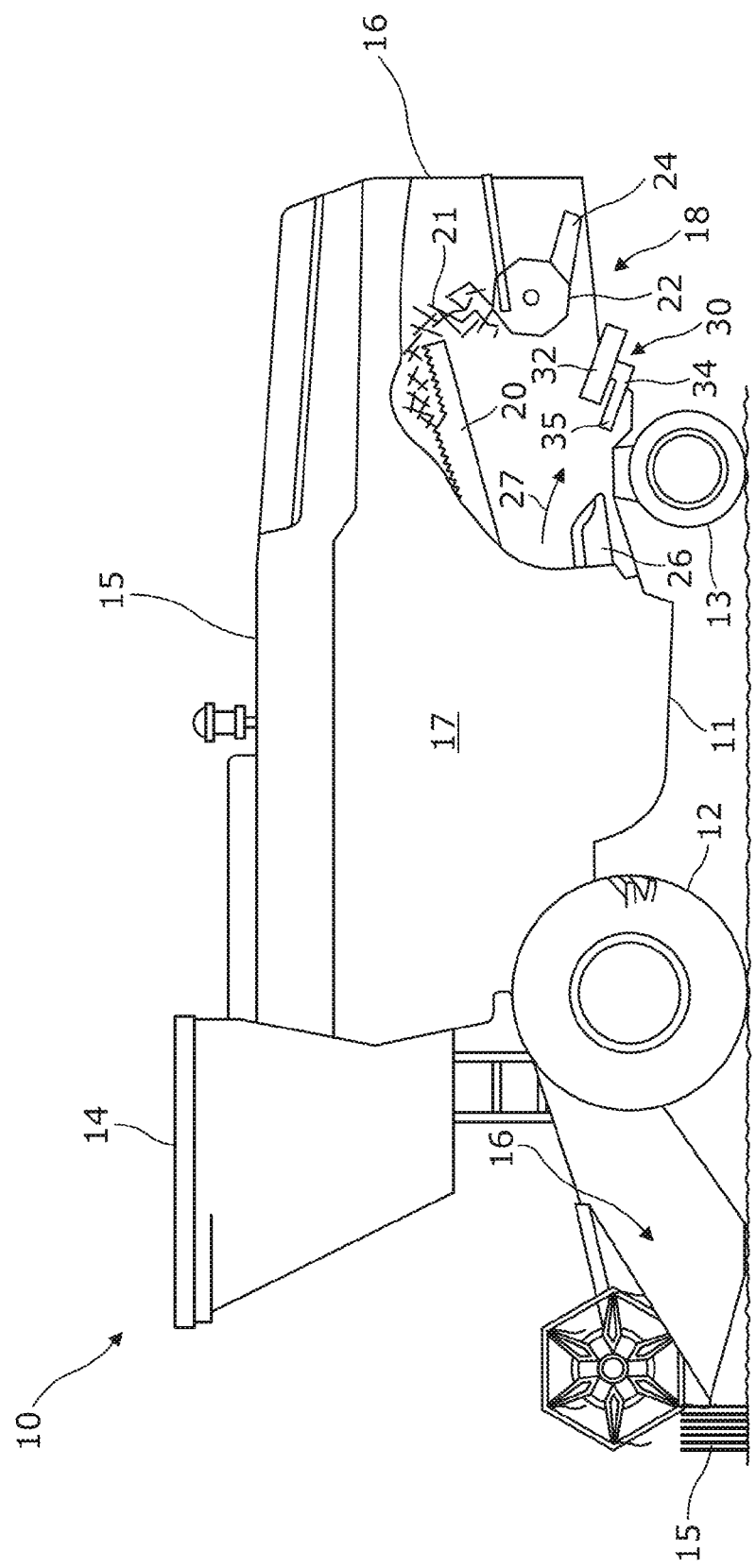
FIG. 1 is a schematic side representation of a combine harvester in accordance with the invention with part of the rear shielding cut away to reveal the residue management system.

With reference to FIG. 1, a combine harvester 10 comprises a chassis 11, front wheels 12, rear steerable wheels 13, and a driver's cab 14. Driven across a field of standing crop a cutting head 16 cuts and gathers the crop material 15 which is then conveyed into the main body 17 of the combine which includes threshing apparatus, separating apparatus, a grain cleaning shoe and a storage tank, as per conventional harvesters. Shielding 16 at the rear of the machine is partially cut away in the figures to reveal the residue management system which is designated generally at 18.

Part of the separating system is shown in the form of straw walkers 20 which serve to separate grain from the remainder of the crop material, hereinafter termed "straw". As shown at 21 straw falls from the rear edge of the straw walkers 20 either into a straw chopper (as per the FIGS. 1 and 2 configuration) or directly onto the ground in a windrow (as per the FIG. 3 configuration). It should be understood that the type of separating system is not limited to conventional straw walkers but may instead comprise one or more axial rotors for example.

The straw chopper 22 in this embodiment has secured thereto a spreader 24 for spreading the chopped straw material. The operation of the spreader 24 is not relevant to describing the current invention and so further description will not be given.

The cleaning shoe is conventional in construction and comprises, inter alia, a series of sieves and a blower unit (not shown). The rear part of the cleaning shoe is shown in the form of part of a chaffer 26 which serves to clean the grain incident thereon whilst ejecting the chaff (or grain husks) from the rear of the shoe as indicated at 27 by means of an air flow generated by the blower unit.

A chaff spreader 30 is provided behind the chaffer 26 and includes a pair of fan modules 32 mounted to a support arm 34 pivotally mounted to the frame 11 at one end so as to pivot around a transverse axis 35. It should be understood that the pair of fan modules are arranged side-by-side and that only the side of one fan module 32 is visible in the figures.

Figure 2:
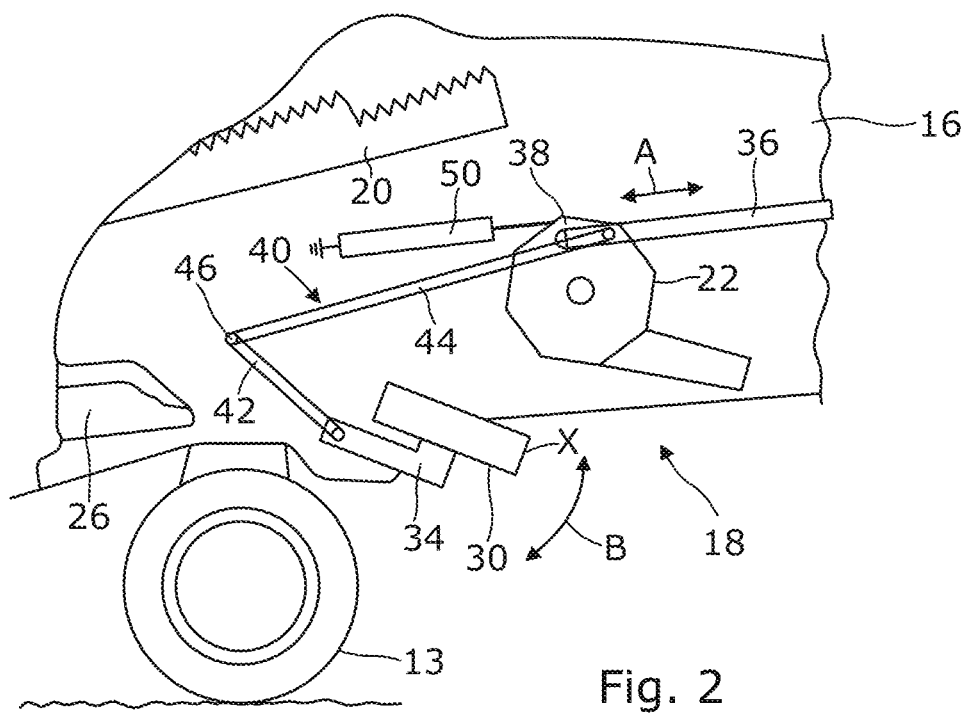
FIG. 2 is an enlarged view of the residue management system in accordance with an embodiment of the invention showing the straw chopper and chaff spreader in an operating position; and, FIG. 3 shows the residue management system of FIG. 2 with the straw chopper and chaff spreader shown in the non-operating position.
Figure 3:
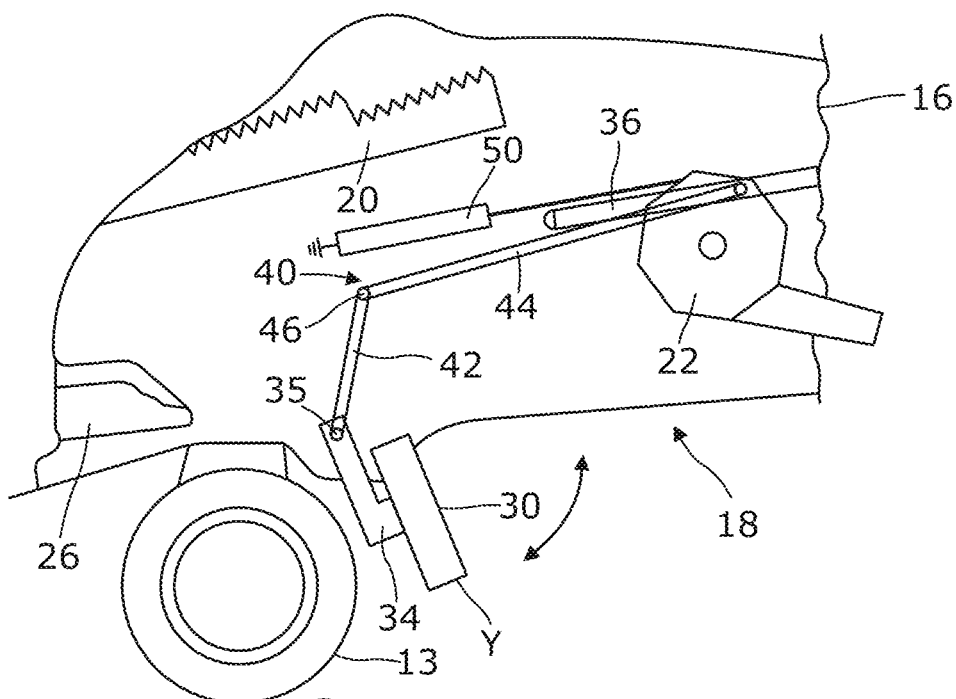

Turning to FIGS. 2 and 3, straw chopper 22 is mounted to the shielding 16 (or combine frame in general) by a pair of longitudinally extending transversely spaced rails 36. The precise manner in which the straw chopper 22 is mounted to the rails 36 is not critical to the understanding of the invention but, by way of example, the mechanism may be of a similar form to that described in U.S. Pat. No. 4,669,489 the contents of which are incorporated herein by reference. The chopper 22 is slideable in a generally fore and aft direction upon the rails 36 between an operating position shown in FIG. 2 and a non-operating position shown in FIG. 3. The direction of movement of the chopper 22 is indicated by arrow A in FIG. 2.

In the operating position shown in FIG. 2 straw 21 ejected from the straw walkers 20 falls under gravity into an inlet provided in the top side 38 of chopper 22. In the non-operating position shown in FIG. 3 the straw 21 simply falls to the ground forming a windrow behind the combine.

In a not-illustrated alternative arrangement the chopper 22 remains stationary when changing between chopping and non-chopping modes, and instead an upstream diverter plate is provided to direct the falling straw either into the chopper or past the chopper onto the ground. In such an arrangement, the chopper 22 may still be shiftable in a fore and aft direction into a non-operating position for maintenance or for access to the inner workings of the combine. It should also be understood that, with a different layout, the operating position of the chopper 22 may be rearward of the non-operating position.

Turning back to the embodiments of FIGS. 2 and 3, the chaff spreader 30 is pivotable around the transverse axis 35 from a spreading, or operating, position X shown in FIG. 2 downwardly into a non-spreading or non-operating position Y shown in FIG. 3. In the operating position X of FIG. 2 the husk or chaff are blown in to the chaff spreader 30 and spread sideways across the working width of the header 16. In an alternative configuration not shown in the drawings, means are provided to direct the chaff into the chopper 22 for subsequent distribution.

In the non-operating position Y of FIG. 3, in operation the chaff passes direct on to the ground. However, this also provides a maintenance position wherein the operator can easily access the rear of the cleaning shoe 26 or straw walkers 20 to deal with blockage or general maintenance.

In accordance with invention, a mechanical linkage designated generally at 40 connects the chaff spreader 30 with the straw chopper 22 so as to couple together their respective movements. Mechanical linkage 40 includes a crank arm 42 secured in fixed positional relationship with respect to chaff spreader arm 34, and a connecting rod 44 pivotally coupled at each end to the crank arm 42 and straw chopper 22.

Although illustrated as sharing a pivot axis 35 with the chaff spreader arm 34, the crank arm 42 may be simply welded or secured in some other manner to the chaff spreader 30 and need not pivot directly around the same axis. Similarly, connecting rod 44 need only be mechanically connected in some manner to the straw chopper 22 whether that be directly as shown or indirectly via another component, providing their respective movements with respect to the combine frame are coupled.

The Figures show only a single crank arm 42 and connecting rod 44. However it is envisaged that the mechanism may be duplication on the not shown side of the residue management system 18. The crank arm 42 and connecting rod 44 are connected by a removable pin 46 which may be removed by the operator as required, for example when it is desired that the shoe material (chaff) is spread but the straw is windrowed.

The linkage 40 may reside inside the shielding 16 or outside.

An actuator, here shown as a hydraulic cylinder 50, may be provided to automate movement of the chopper 22 and chaff spreader 30 (without manual intervention of the operator). In the embodiment shown, the hydraulic cylinder 50 is connected between the combine frame 11 and straw chopper 22. Operation of the cylinder 50 causes the chopper 22 to move in a fore and aft direction which, in turn, causes pivoting movement of the chaff spreader 30 by means of linkage 40.

It should be understood that alternative forms of actuator may be employed instead such as electric motors, pneumatic cylinders or chain-and-sprocket drives. It should also be understood that any actuator may be connected at various different locations on the residue management system 18. For example, an actuator may be connected between the combine frame 11 and the connecting rod 44.

Although described in relation to a straw chopper 22 having a linear degree of freedom of movement it is envisaged that the inventive linkage may be applied to alternative systems, for example those with pivoting straw choppers or even sliding chaff spreaders.

Although the disclosed systems have been described with reference to the example embodiments illustrated in the attached drawing figures, it is noted that equivalents may be employed and substitutions made herein without departing from the scope of the disclosure as protected by the following claims.

The invention claimed is:

1. A combine harvester comprising a residue management system having a chaff spreader pivotally mounted proximate to a cleaning shoe ejection zone, the chaff spreader being pivotable about a transverse pivot axis between a spreading position and a non-spreading position, wherein, in the spreading position, the chaff spreader is configured to collect chaff ejected by a cleaning shoe, and a straw chopper mounted in the vicinity of a straw ejection zone and behind the chaff spreader, the straw chopper being moveable between an operating position and a non-operating position, and a mechanical linkage connecting the chaff spreader and straw chopper, wherein movement of the straw chopper from the operating position to the non-operating position is translated into pivoting of the chaff spreader from the spreading position to the non spreading position.

2. A combine harvester according to claim 1, wherein the chaff spreader pivots downwardly when moving from the spreading position to the non-spreading position.

3. A combine harvester according to claim 1, wherein the chaff spreader comprises at least one fan module mounted to an arm which is pivotally connected to a machine frame member, the fan module comprising a rotating impellor within a housing, the housing having an inlet for receiving chaff ejected by the cleaning shoe, and an outlet for ejecting the received chaff.

4. A combine harvester according to claim 1, wherein the straw chopper is mounted to a frame member of the combine harvester by a sliding mechanism which permits linear movement of the straw chopper in a generally fore and aft direction between the operating position and non-operating position, the sliding mechanism comprising a pair of longitudinally extending, transversely spaced, rails upon which the straw chopper is slideably mounted.

5. A combine harvester according to claim 1, wherein the mechanical linkage comprises a crank arm associated with the chaff spreader and a connecting rod connected between the crank arm and the straw spreader.

6. A combine harvester according to claim 5, wherein the crank arm is coupled to the connecting rod by a removable pin.

7. A combine harvester according to claim 1, the residue management system further comprising an actuator configured to control movement of the straw chopper between the operating position and the non-operating position.

* * * * *